United States Patent [19]

Schmid et al.

[11] Patent Number: 5,781,669

[45] Date of Patent: Jul. 14, 1998

[54] ACOUSTOOPTICAL WAVEGUIDE DEVICE FOR WAVELENGTH SELECTION AND PROCESS FOR MAKING SAME

[75] Inventors: Steffen Schmid, Monza; Sergio Bosso, Assago, both of Italy

[73] Assignee: Pirelli Cavi S.p.A., Italy

[21] Appl. No.: 625,367

[22] Filed: Apr. 1, 1996

[30] Foreign Application Priority Data

Apr. 14, 1995 [IT] Italy ................. MI95A0771

[51] Int. Cl.⁶ .................. G02F 1/335; H01L 21/70
[52] U.S. Cl. .................. 385/7; 385/9; 385/10; 385/14; 385/15; 385/39; 385/40; 385/41; 385/130; 385/131; 385/132; 385/11; 437/51; 437/101; 437/141
[58] Field of Search ................. 385/2, 7, 8, 9, 385/10, 11, 14, 15, 39, 40, 41, 42, 130, 131, 132; 437/51, 95, 101, 108, 109, 134, 141

[56] References Cited

U.S. PATENT DOCUMENTS

| 3,909,108 | 9/1975 | Taylor | 385/9 X |
|---|---|---|---|
| 4,387,353 | 6/1983 | Giallorenzi et al. | 385/40 X |
| 4,390,236 | 6/1983 | Alferness | 385/2 X |
| 4,533,207 | 8/1985 | Alferness | 385/11 |
| 5,002,349 | 3/1991 | Cheung et al. | 385/11 X |
| 5,218,653 | 6/1993 | Johnson et al. | 385/11 |
| 5,400,171 | 3/1995 | Song | 385/7 X |
| 5,455,877 | 10/1995 | Baran et al. | 385/11 |

OTHER PUBLICATIONS

Journal of Lightwave Technology, Jul. 1994, USA vol. 12, No. 7.
Electronics Letters, 26 Mar. 1992, UK, vol. 28, No. 7.
IBM Technical Disclosure Bulletin vol. 35, No. 3, Aug. 1992.

*Primary Examiner*—Brian Healy
*Attorney, Agent, or Firm*—Brooks Haidt Haffner &Delahunty

[57] ABSTRACT

An acoustooptical wavelength device for wavelength selection includes one substrate of a birefringent and photoelastic material on which there is formed: first and second rotation stages of the polarization plane of an optical signal in a first wavelength interval, wherein each stage comprises at least one optical waveguide traveled over by the signal; at least one optical waveguide, connecting the two stages and carrying one single polarizer consisting of an evanescent-wave polarization coupler; and at least one optical waveguide carrying one polarizer being finally provided downstream of the second stage.

26 Claims, 8 Drawing Sheets

ACOUSTOOPTICAL WAVEGUIDE DEVICE FOR WAVELENGTH SELECTION AND PROCESS FOR MAKING SAME

FIELD OF THE INVENTION

The present invention relates to an acoustooptical waveguide device for wavelength selection.

BACKGROUND OF THE INVENTION

Operation of an acoustooptical waveguide device is based on the interaction between light signals propagating along optical waveguides formed on a substrate of a birefringent and photoelastic material and acoustic waves generated by appropriate transducers and propagating on the substrate surface.

Such a device is in particular employable as an optical filter. By controlling the frequency of the acoustic waves it is possible to tune the spectral response curve of the filter, which makes the filter suited for example for channel splitting in an optical wavelength-division multiplexing communication system, for tuning the emission wavelength in a laser cavity or regenerating the shape of the pulses in a pulse optical communication system.

In an optical telecommunication system with wavelength-division multiplexing (usually referred to as WDM) transmission, several channels, that is several transmission signals independent of each other, are sent on the same line, usually consisting of an optical fibre, by optical wavelength multiplexing. The transmitted channels can be both digital and analog and are distinguishable from each other because each of them is associated with a specific wavelength. For splitting the individual channels again, filters are required which must be capable of transmitting a wavelength band centered on the wavelength of one channel and sufficiently narrow to stop the adjacent channels. Tunable filters, in particular, enable the channel selection to be changed and therefore the system to be reconfigured without altering the cabling of the components.

Acoustooptical filters are in particular appropriate for such a use. They also enable the simultaneous selection of several channels: if the acoustic wave propagating at the substrate surface is the superposition of acoustic waves at different frequencies, the filter has a passband corresponding to the sum of different wavelength intervals, determined by the frequencies of the acoustic waves. By suitably selecting such frequencies, the passband of the filter can be controlled so that it will transmit only the desired wavelengths, corresponding to the selected channels.

A polarization independent planar-waveguide acoustooptical filter is described in an article by D. A. Smith et al, published in Applied Physics Letters, vol. 56, No. 3, 15 Jan. 1990, pages 209–211. The device (FIG. 1A) comprises a polarization coupler on a LiNbO$_3$ substrate, which splits the TE and TM components of the incident signal, two acoustooptical polarization converters operating in parallel on the two components and a polarization coupler recombining the signals.

The spectral transmission curve of the device has a central peak, with 1.3 nm bandwidth, and side lobes. It is shown by theory (as reported for example in H. Herrmann et al. Electronics Letters, Vol. 28, No. 11, 21 May 1992, pages 979–980) that in filters of the type described in the above article, the first side lobe is not lower than the theoretical limit of −9.4 dB.

The filter described in the article has a single acoustooptical interaction stage. Filters of this type provide an attenuation, at wavelengths outside the transmitted band, which is insufficient for the above mentioned applications.

In addition, on passing through the filter, the components at the two polarizations are subjected to a wavelength variation, which is different for the two components, by effect of interaction with the acoustic wave.

Acoustooptical filters provided with a second filtering stage on one and the same substrate of birefringent and photoelastic material can be made: Two-stage devices show a spectral response curve characterized by a greater attenuation outside the passband than single-stage filters and have reduced transmission side lobes. In two-stage devices, in addition, the second stage can compensate for the optical frequency variation taking place in the first stage, by an amount corresponding to the acoustic wave frequency, so to restore the initial frequency.

A two-stage planar-waveguide integrated acoustooptical filter is disclosed in U.S. Pat. No. 5,381,426 filed in the name of the Assignee of this application (FIG. 1B). It is provided for use as a controlled wavelength selection filter within the cavity of an active mode-locking laser.

U.S. Pat. No. 5,002,349 in the name of Cheung et al., discloses a planar-waveguide integrated acoustooptical device on a LiNbO$_3$ substrate. In one version thereof, shown in FIG. 2A, this device is made by aligning on the same substrate, two polarization independent acoustooptical filters, each of said filters comprising two waveguide polarization splitters, for splitting and recombining the two TE and TM components respectively, before and after the acoustooptical interaction stages. In order to calibrate the polarization-splitting property, the polarization splitters are each provided with electrodes. For each polarization splitter an independent adjustment is carried out by means of said electrodes.

The Applicant has noticed that the attenuation to which the optical signals were subjected on passing through such a device is about twice that of a single-stage device, due to the four passages through the polarization splitters.

The Applicant has also observed that the device becomes complicated due to the presence of the calibration electrodes, while electric adjustment and control circuits are made necessary.

In addition, in the absence of the electrodes, the transmission of each splitter would not only depend on polarization, but also slightly on wavelength, as a result of construction tolerances. For each splitter, the wavelength interval corresponding to a low attenuation of the transmitted polarization component would be slightly different. By placing several splitters in series, the overall low-attenuation band goes down to the intersection of the low-attenuation intervals of each individual splitter. Due to the presence of four polarization splitters in series, the device would have an excessive attenuation or at least a reduced tuning interval, as compared with the requirements of the previously listed applications.

Furthermore, the overall length of the described device is at least twice that of a single-stage device, thereby reaching a critical bulkiness relative to the limited sizes of the most commonly available LiNbO$_3$ substrates.

A two-stage planar-waveguide integrated polarization independent acoustooptical filter is also disclosed in a paper by F. Tian et al, published in Journal of Lightwave Technology, Vol. 12, No. 7, July 1994, pages 1192–1197. It comprises (FIG. 2B) two single-polarization filters on an LiNbO$_3$ substrate, with polarizations perpendicular to each other, operating in parallel and two polarization couplers/ splitters to split and recombine the optical-signal components according to the two perpendicular polarizations.

The single-polarization filters comprise a TE pass and TM pass polarizer, respectively.

The TM pass polarizer in particular consists of a waveguide along which, in two 1.5 mm long regions, adjacent to the waveguide on both sides, the larger than ordinary refractive index is greater than in the material forming the substrate. This causes the TE polarization component, no longer guided, to be outcoupled in the substrate, whereas the TM polarization component can pass the structure.

The increase in the larger than ordinary refractive index is achieved by the proton exchange technique, consisting of exposing said areas to contact with an acid solution over a predetermined period of time and at an appropriate temperature, so as to achieve the replacement of part of the $Li^+$ ions in the substrate by $H^+$ ions, and in carrying out a subsequent optional thermal annealing step.

In the case of the above article, the proton exchange was executed in diluted benzoic acid at 250° C. over a period of 15.5 hours and was followed by thermal annealing for 4 hours at 330° C.

The Applicant's experience has shown that the manufacture of proton-exchange polarizers of the above type is very critical, in particular owing to the high accuracy required in positioning the photolithographic masks and to the limited admissible ranges for parameters controlling the proton exchange process.

In addition, a time instability of the spectral properties of polarizers has been noticed.

Furthermore, the manufacture of both TM- and TE-pass type polarizers requires specific process steps, distinct for each polarizer type and different from those required for the manufacture of the other components of the device, which makes the production process of the device long and complex.

SUMMARY OF THE INVENTION

The present invention comprises an acoustooptical waveguide device for wavelength selection of simple manufacture, reduced size, provided with a wide tuning interval and showing spectral features which are stable in time.

The present invention further comprises a simple and reliable process for making an acoustooptical waveguide device for wavelength selection.

According to one aspect, the invention relates to an acoustooptical waveguide device for wavelength selection, comprising one substrate of a birefringent and photoelastic material on which there is formed:

- a first rotation stage of the polarization plane of an optical signal in a first wavelength interval, including at least one optical waveguide traveled over by said signal;
- a second rotation stage of the polarization plane of an optical signal in a second wavelength interval, including at least one optical waveguide traveled over by said signal;
- at least one optical waveguide, connecting said first and second stages carrying one single polarization-selective element;
- at least one optical waveguide, downstream of said second stage, carrying a polarization-selective element; characterized in that said single polarization-selective element consists of an evanescent-wave polarization coupler.

In a preferential solution, at least one of said first and second stages comprises means for generating a surface acoustic wave and most preferentially said substrate is comprised of an acoustic waveguide including at least one section of one of said optical waveguides of said first and second stages.

In a particular embodiment, this acoustooptical device comprises a first acoustic waveguide extended over a substrate portion including said optical waveguide of said first stage, and a second acoustic waveguide extended over a substrate portion including said optical waveguide of said second stage.

Preferably said means for generating a surface acoustic wave are located within at least one of said acoustic waveguides, close to one end of the latter, for unidirectional propagation of said acoustic wave in said acoustic waveguide, and advantageously comprises a series of interdigitated electrodes disposed transversally of said acoustic waveguide. Said acoustooptical device may comprise an acoustic absorber disposed at said end of said acoustic waveguide.

The device may further comprise an acoustic absorber located at the end of said acoustic waveguide opposite to the end where said means for generating a surface acoustic wave is located.

Alternatively, said means for generating surface acoustic waves can consist of two series of interdigitated electrodes, disposed at a predetermined distance from each other, respectively supplied with a first alternating-voltage electric signal and a second electric signal obtained by offsetting said first electric signal through 90°, for generating a unidirectional acoustic wave.

In a preferential embodiment the device comprises two optical parallel waveguides in each of said first and second stages and two optical connection waveguides between said first and second stages, wherein each optical connection waveguide carries one single polarization-selective element adapted to transmit one of two mutually-perpendicular polarization components and wherein at least one of said single polarization-selective elements consists of an evanescent-wave polarization coupler.

In this embodiment one of said single polarization-selective elements can be a TE pass polarizer and can comprise a metal layer overlying the corresponding optical connection waveguide between the first and second stages, with a buffer layer interposed therebetween.

Alternatively, both of said single polarization-selective elements can consist of evanescent-wave polarization couplers.

In the last mentioned alternative solution, both said evanescent-wave polarization couplers can be bar-transmission couplers for the respective passing polarization, or one of said evanescent-wave polarization couplers can be a bar-transmission coupler for the respective passing polarization, whereas the second of said evanescent-wave polarization couplers is a cross-transmission coupler for the respective passing polarization. Said second evanescent-wave polarization coupler is advantageously connected to the respective optical connection waveguide by a curved waveguide section, and may comprise a straight central section forming a non-zero angle with the respective connection waveguide.

In a preferential embodiment said birefringent and photoelastic material is $LiNbO_3$ and in said embodiment said optical waveguides and evanescent-wave polarization couplers are advantageously made by photolithographic masking, deposition of a metal layer and subsequent diffusion of the metal within the substrate. Said metal may advantageously be titanium.

In another aspect, the present invention relates to a process for making an acoustooptical waveguide device for wavelength selection, comprising the following steps:

- forming at least one acoustic waveguide on one substrate made of a birefringent and photoelastic material, by diffusion of a first metal within said substrate;
- forming a first and a second evanescent-wave polarization couplers on said substrate, by photolithographic deposition and subsequent diffusion of a second metal within the substrate itself, as well as at least one optical waveguide for connection between said polarization couplers, which optical waveguide is at least partly included in said acoustic waveguide;
- forming one single polarization-selective element along said optical connection waveguide;
- forming an electroacoustic transducer comprising interdigitated electrodes, within at least one of said acoustic waveguides, by photolithographic deposition of a third metal onto said substrate;

characterized in that said step of forming a single polarization-selective element is included in said step of forming said first and second polarization couplers and said optical connection waveguide, and consists in forming a third evanescent-wave polarization coupler. Preferably said first, second and third evanescent-wave polarization couplers are identical with each other.

In an advantageous version this process comprises the formation on said substrate, by photolithographic deposition and subsequent diffusion within said substrate of said second metal, of a first and a second optical connection waveguides between said first and second polarization couplers, which optical waveguides are at least partly included in said acoustic waveguide, and comprises the formation of one single polarization-selective element along each of said optical connection waveguides.

Preferably said step of forming said polarization-selective elements is included in said step of forming said first and second polarization couplers and said optical connection waveguides, and consists in forming a third and a fourth evanescent-wave polarization couplers along said first and second optical connection waveguides, respectively.

Most preferably, said first, second, third and fourth evanescent-wave polarization couplers are identical with each other.

BRIEF DESCRIPTION OF THE DRAWINGS

More details will appear from the following description, with reference to the accompanying drawings, in which.

DETAILED DESCRIPTION OF PREFERRED EMBODIMENTS

Figure 1A:
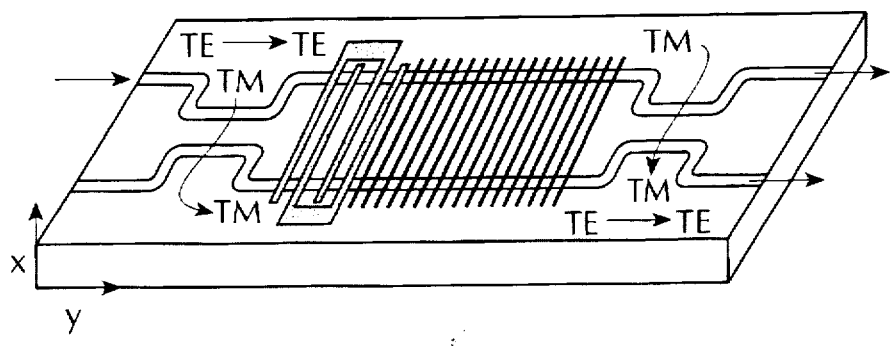
FIGS. 1A, 1B are two diagrams showing acoustooptical filters according to the known art.
Figure 1B:
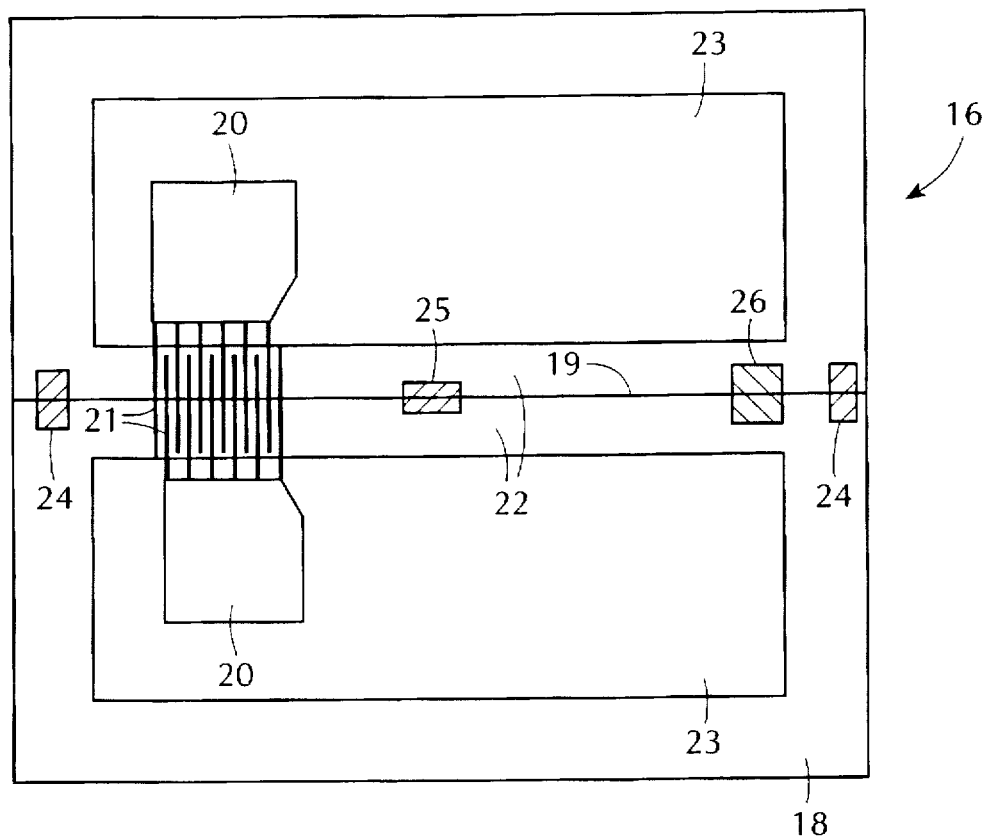

A waveguide integrated acoustooptical filter is disclosed in U.S. Pat. No. 5,381,426 filed in the name of the same Assignee of this application. It will be described with reference to FIG. 1B, corresponding to FIG. 3 in said patent.

Filter 16 consists of a substrate 18 utilizing an $LiNbO_3$ crystal cut at right angles to the x axis, on which an optical channel waveguide 19 having a y propagation orientation, single-mode in the wavelength band of interest ($1530<\lambda<1560$), is made by titanium diffusion, by virtue of which the refractive index of lithium niobate in the substrate is locally increased so as to confine the optical signal within the required path.

Along the optical waveguide 19 a pair of acoustooptical transducers 20 is present. The transducers consist of metal plates having several comb electrodes 21 alternated with each other and superposed to the waveguide, adapted to generate, by piezoelectric effect following an electric excitation applied thereto, an acoustic wave propagating through the crystal.

To the sides of the optical waveguide 19, an acoustic waveguide 22 is defined, confined by two side areas 23 in which titanium is diffused in the lithium niobate substrate, in order to increase the propagation velocity of an acoustic wave through these side areas in relation to the central area 22, so as to guide the acoustic wave in said central area.

Two TE pass polarizers 24 are present, upstream of the electrodes 21 and along the end section of the waveguide 19, downstream of the electrodes 21 themselves, whereas a TM pass polarizer 25 is present at an intermediate position between the two polarizers 24.

The TE pass polarizers 24 are formed of a dielectric layer, made of silica for example, applied to the optical waveguide 19 in a predetermined thickness and overlaid with a metal layer. These polarizers only enable passage of the light signal TE mode component polarized in the surface plane of the substrate crystal.

The TM pass polarizer 25 is in turn formed of two proton-exchange areas made on the sides of the waveguide, over some millimeters of length. This polarizer only enables passage of the light signal TM mode component polarized in a plane is perpendicular to the surface of the substrate crystal.

An acoustic absorber 26 is present at a predetermined distance from the TM pass polarizer 25, on the opposite side from the electrodes 21. It is formed of a layer of a soundinsulation material applied to the crystal surface, adapted to absorb the acoustic wave and therefore prevent the same from further interacting with the light wave.

The RF (radio-frequency) generator controlling the acoustooptical filter has a frequency selectable between 170 MHz and 180 MHz for selection of the wavelength of the passband center in the desired range (1530<λ<1560).

Operation of this device is based on the conversion between TE and TM components (and vice-versa) of the polarized optical signals propagating along the optical waveguide and having a wavelength in an appropriate band. This conversion is carried out by the interaction of the optical signals with the acoustic wave propagating along the acoustic waveguide 22 in the same direction as the optical radiation. Only the TE component of the optical signals entering the polarizer 24 located upstream of the waveguide 19 is transmitted to the waveguide itself. Along the first guide section, upstream of the polarizer 25, the wavelengths comprised in a passband determined by the acoustic wave parameters are converted from TE polarization to TM polarization. Wavelengths external to this band, on the contrary, are not converted and keep their polarization in the substrate surface plane. The last mentioned wavelengths are therefore stopped by polarizer 25, only transmitting the TM component of the signals having wavelengths inside the passband, the polarization of which was converted by interaction with the acoustic wave. The waveguide section downstream of polarizer 25 operates as a second stage of the filter, with the acoustic wave tail propagating in the waveguide 22 and interacting with the optical TM signals. The second stage has the same operation as the first stage, but with mutually exchanged polarizations. Signals with a wavelength inside the passband are converted from TM polarization to TE polarization and transmitted by polarizer 24 downstream of the guide 19. Signals outside the passband are stopped by said polarizer 24.

A two-stage waveguide integrated polarization independent acoustooptical filter is disclosed in the already mentioned article by F. Tian et al., published in the Journal of Lightwave Technology.

Figure 2A:
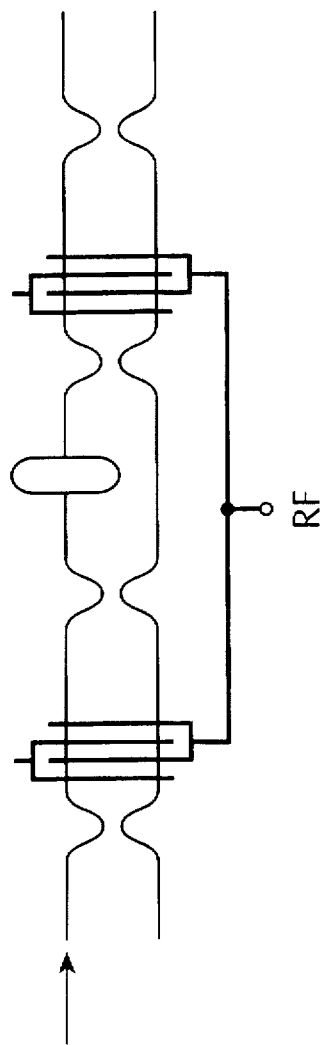
FIGS. 2A, 2B are two diagrams showing acoustooptical filters according to the known art.
Figure 2B:
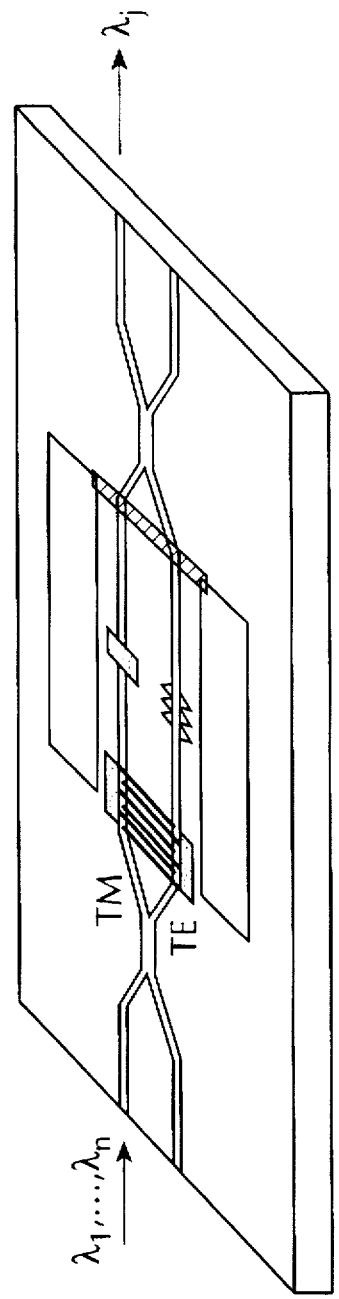

As shown in FIG. 2B, the input signal to the device is divided into the two TE and TM components, by a waveguide polarization coupler formed in the substrate. The two outputs from the polarization coupler are connected to two two-stage filters, each of them having a polarizer between the two stages, TM pass and TE pass respectively. The two filters are disposed side by side on the substrate, along the same acoustic waveguide, where an acoustic wave generated by appropriate interdigitated transducers propagates in the same direction as the optical signals. The outputs of the two two-stage filters are finally combined by a polarization coupler. An acoustic absorber is placed at the end of the acoustic waveguide for the purpose of attenuating the residual surface acoustic wave.

The TM pass polarizer, in particular, is made by proton exchange in two regions about 1.5 mm long, adjacent to the optical waveguide on both sides. The proton exchange causes the larger than ordinary refractive index to grow, which results in the TE component being no longer guided and being dispersed in the substrate. The TM component on the contrary passes through the polarizer with small losses.

The Applicant's experience has proved that the manufacture of proton-exchange polarizers of this type makes the whole production process of the acoustooptical devices particularly critical.

The Applicant made samples of TM pass polarizers on LiNbO₃ substrates on which a single-mode optical waveguide was formed by diffusion of titanium for 9 hours at 1030° C. The polarizers were produced by masking and subsequent proton exchange in undiluted benzoic acid over periods of time ranging from 2 to 7 hours and at different temperatures in the range of 230° C. to 240° C. The distance between the two areas submitted to proton exchange placed at both sides of the optical waveguide was between 12 µm and 13.5 µm.

The values of the extinction ratio (ratio of the output power of the device for the attenuated component, in this case the TE component, to the overall output power) in the obtained samples were comprised between −25.3 dB and −3.9 dB. The attenuation values for the transmitted polarization (in this case the TM component), on the contrary, ranged from very low values to 1.1 dB.

Some samples were submitted to a subsequent thermal annealing step at 320° C. for a period of 15 to 90 minutes, thereby generally achieving a reduction in the extinction ratio to values between −25 dB and −20 dB, but at the same time an increase in the attenuation for the TM component to values of the order of 2 dB.

In a two-stage acoustooptical filter the value of the extinction ratio for the polarizers located between first and second stage determines the residual background noise value for the device as a whole, wherein by residual background noise it is meant the maximum attenuation undergone by signals with wavelength outside the transmission band, on passing through the device.

A polarizer to be used in a two-stage acoustooptical filter should simultaneously have an extinction ratio lower than −20 dB and an attenuation for the transmitted mode lower than 0.5 dB.

The Applicant could observe that the positioning of the photolithographic mask on the substrate for confinement of the area to be submitted to proton exchange needs a degree of accuracy much higher than that required for the photolithographic masks needed during the other production steps of an acoustooptical device, such as those used for confining the titanium diffusion during the manufacturing of the waveguides, or those used for the interdigitated electrodes and the TE pass polarizer. All parameters controlling the proton exchange process and the subsequent possible thermal annealing step also proved to be very critical. Very small variations even in a single parameter may result in polarizers that do not meet the required standards and are therefore to be discarded.

Figure 3A:
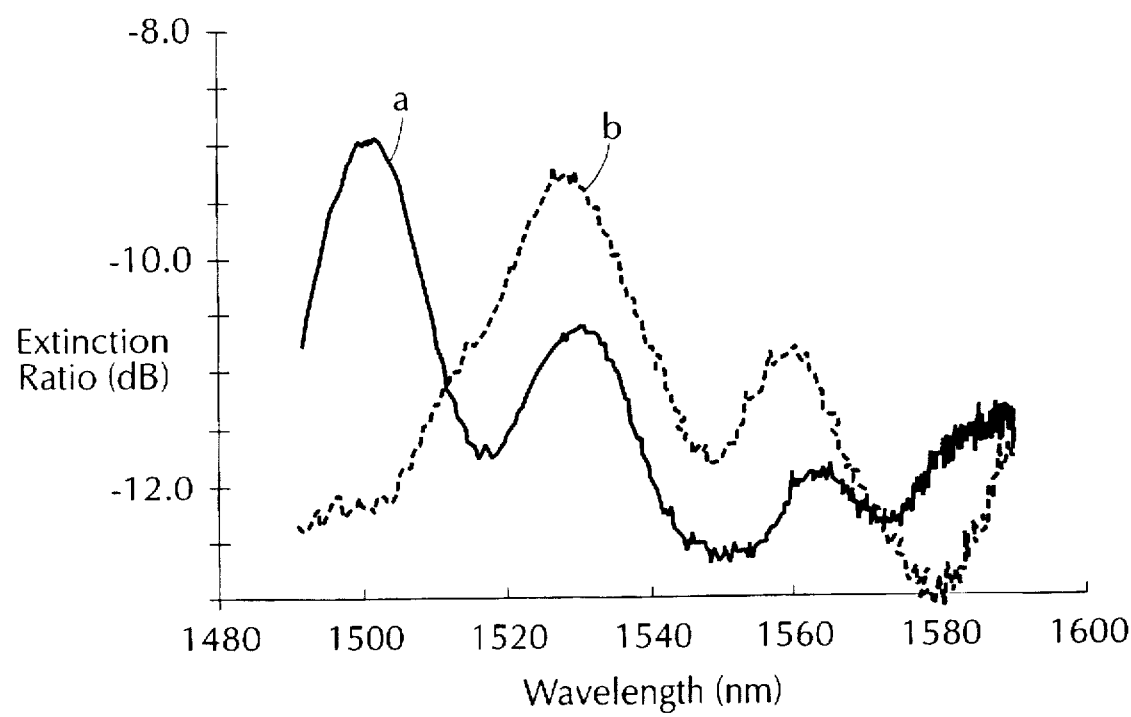
FIGS. 3A, 3B show two graphs relating to the temperature variation of the spectral response of TM pass polarizers according to the known art.

In addition, some of the produced TM pass polarizers were exposed to temperatures higher than 80° C. for some hours and showed important alterations in the spectral response with time. Shown in FIG. 3A is a graph illustrating the extinction ratio for one of the polarizers measured before (a) and after (b) exposition to a temperature of 100° C. for 20 hours. It can be seen a displacement of the spectral curve of about 25 nm towards higher wavelengths and a consequent variation of several dB in the extinction ratio at each wavelength. Variations could be observed for several different polarizers submitted to the same thermal treatment, with displacements of the spectral response curve comprised between 20 and 30 nm.

Variations in the spectral response of TM pass polarizers made by proton exchange also take place at lower temperatures, for longer exposition times, and contribute to making the use of these components critical.

Figure 3B:
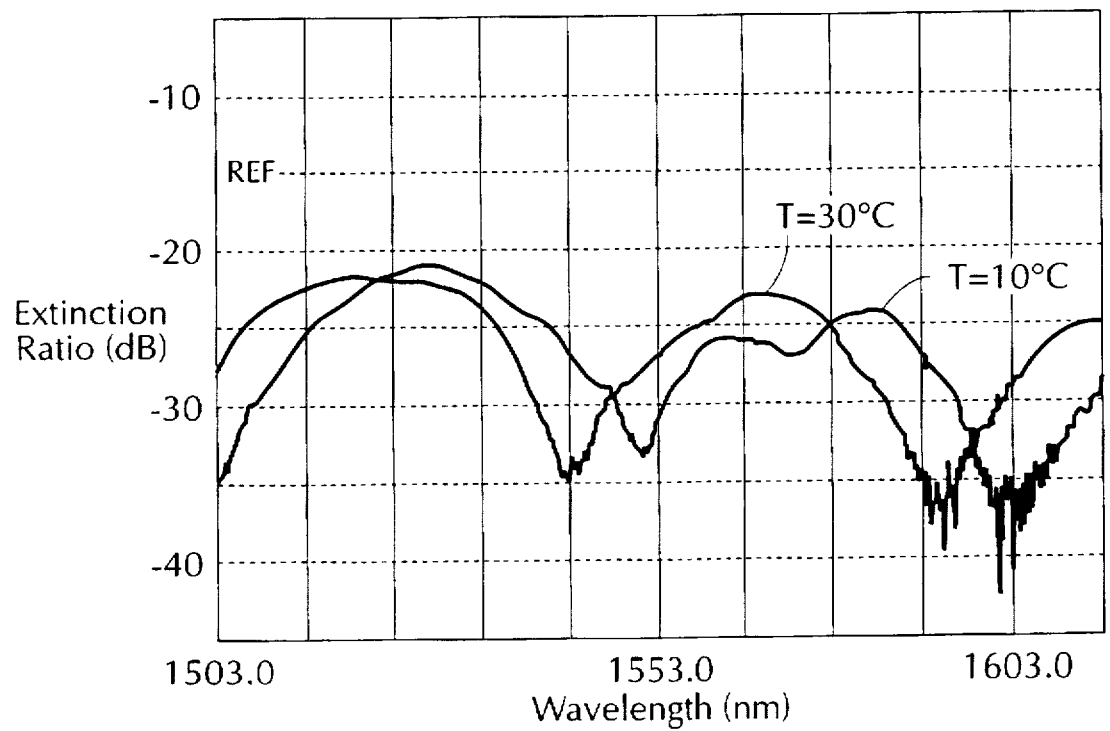

In addition to permanent variations in the spectral response curve due to exposition to high temperatures, the TM pass polarizers made by proton exchange also show a reversible-type dependence of the spectral response on temperature. FIG. 3B for example, reproducing the spectral curves of the extinction ratio for a polarizer at temperatures of 10° C. and 30° C., shows variations reaching 10 dB at some wavelengths.

The Applicant could also observe that the process for the manufacture of the acoustooptical filter described in said article by F. Tian et al. is made long and complicated by the necessity to provide specific process steps for each of the polarizers, that is TM pass and TE pass polarizers, used in the device, in addition to the process steps required for making the optical waveguides, the coupler and polarization coupler, the acoustic waveguide and interdigitated transducers.

A two-stage waveguide integrated acoustooptical device according to the invention will be now described with reference to FIG. 4.

On a substrate 30 the following components are formed. A channel optical waveguide 31 has one end at the substrate edge and is adapted to receive the optical signals input to the device, for example through a suitably connected optical fibre. The other end of the waveguide 31 is connected to the access waveguide 1 of a polarization coupler 32. An optical waveguide 28 has one end at the substrate edge and the other end connected to the access waveguide 4 of coupler 32. The access guide 3 of coupler 32 is connected to a waveguide 35 connecting up with the access guide 4 of a polarization coupler 40. The access guide 3 of coupler 40 is connected to a waveguide 36, connecting up with the access guide 4 of coupler 37. The access guide 2 of the last mentioned coupler is connected to a waveguide 38 terminating at the substrate edge and enabling the optical signal output, for example through connection with an optical fibre. The access guide 3 of coupler 37 is finally connected to a waveguide 29 terminating at the substrate edge.

Also formed on the substrate 30 are the following. An acoustic waveguide 41 is extended over a substrate portion comprising the optical waveguides 35, 36, confined by two strips 42 and 43 disposed symmetrically to the optical waveguides 35, 36, in which the acoustic wave velocity is higher than in guide 41. An electroacoustic transducer 44 is located along the acoustic waveguide 41, close to the waveguide 35 end connected to coupler 32 and adapted to generate a surface acoustic wave within the acoustic waveguide. A acoustic absorbing means 45 is placed along the acoustic waveguide 41, close to the waveguide 36 end connected to coupler 37 and adapted to absorb the residual surface acoustic wave. A acoustic absorbing means 46 is placed along the acoustic waveguide 41, close to the waveguide 34 end connected to coupler 32 and adapted to absorb the acoustic wave generated by the transducer 44 propagating in a direction opposite to that of the optical signals.

In an acoustooptical device made by the Applicant the manufacturing parameters have been selected for operation at room temperature in an optical wavelength band at least 100 nm and centered around 1550 nm, of particular interest for optical communications. A person skilled in the art, by selecting appropriate parameter values, in particular of the optical waveguides, polarization couplers and acoustic wave transmitted in the acoustic waveguide, will be able to adapt the device for other temperatures or other wavelength bands, for example the wavelength band around 1300 nm, which is also of interest for optical communications.

Substrate 30 is formed of an $LiNbO_3$ crystal cut at right angles to the x axis. The waveguides 31, 35, 36, 38 and waveguide 5 sections of the polarization couplers 32, 40, 37 are oriented along the crystal y-axis.

Instead of $LiNbO_3$, another birefringent and photoelastic material may be used for the substrate. Possible materials are $LiTaO_3$, $TeO_2$, $CaMoO_4$, for example.

The increase in the acoustic wave velocity in the bands delimiting the acoustic waveguide can be made by diffusion of an appropriate substance in the substrate.

In a device made by the Applicant, the acoustic waveguide 41, of an overall length of about 30 mm, was made by creation of a photolithographic mask confining the substrate strips 42 and 43 separated from each other by a distance of 110 µm, deposition of a titanium layer of a thickness of 160 nm within the confined surface, and subsequent diffusion of titanium in the substrate for a duration of 31 hours, in a furnace at a temperature of 1060° C. By effect of diffusion, the acoustic wave velocity is increased by about 0.3%, so that, due to the action of areas 42 and 43, the acoustic waves are confined along the guide 41. The latter is a single-mode guide for the acoustic waves used. The attenuation coefficient for the acoustic waves is about 0.1 dB/cm.

The optical waveguides and polarization couplers can be made by diffusion in the substrate of a substance capable of raising the refractive index.

In a device made by the Applicant, optical waveguides and polarization couplers are obtained by means of a photolithographic mask, deposition of a 105 nm thick titanium layer and subsequent diffusion for 9 hours at a temperature of 1030° C.

At the optical waveguides the photolithographic mask has an opening about 7.0 µm wide.

Transmission tests on a great number of straight waveguides of this type have shown attenuation values of about 0.03 dB/cm for the TM component and 0.07 dB/cm for the TE component.

The polarization couplers 32, 37, 40 are evanescent-wave couplers on a planar substrate.

By evanescent-wave coupler it is meant a device consisting of two optical waveguides that are close to each other over a section thereof, to such an extent that each of the guides is within the evanescent wave of the radiation propagating in the other guide, so as to enable coupling of radiation between the two waveguides and transfer of optical power between each other.

The use of evanescent-wave couplers on a lithium niobate substrate to make polarization splitters is known, for example, from a paper by A. Neyer published in Applied Physics Letters, vol. 55, No. 10, Sep. 4, 1989, pages 927–929, which is herein incorporated by reference.

Figure 5:
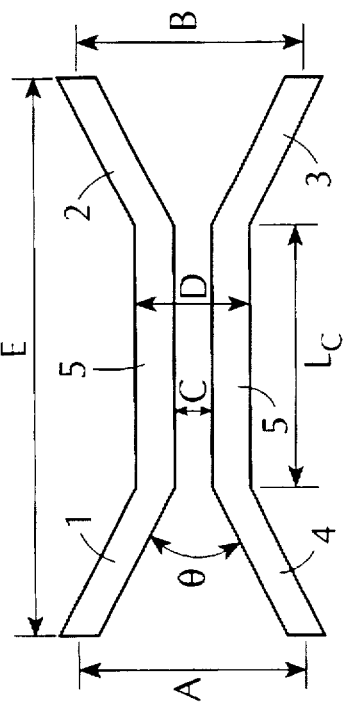
FIG. 5 is a diagram showing an evanescent-wave polarization coupler used in the present invention.

The evanescent-wave polarization couplers provided for use in the device of the invention are made according to the diagram shown in FIG. 5. They consist of two single-mode waveguides of length $L_c$, parallel to and separated from each other by a distance C, connected to the single-mode access waveguides 1, 2 and 4, 3 respectively. The distance between the two external edges of the waveguides 5 is denoted by D. Waveguides 1–5 have the same width as waveguides 31, 35, 36, 38. The same angle θ is present between the access guides 1 and 4 and the access guides 2 and 3. The maximum distance between the center lines of the access guides 1 and 4 is denoted by A. The maximum distance between the center lines of the access guides 2 and 3 is denoted by B. E denotes the overall length of the coupler.

Distance C is selected sufficiently small to enable coupling of radiation between the two guides 5. In particular, it is possible to make couplers with C=0, in which the two parallel guides are replaced by a single two-mode guide 5, of overall width=D. In the following of the present description reference will be made to this case, generalization to the case C>0 being obvious to a person skilled in the art.

Operation of the evanescent-wave polarization couplers is as follows. The single-mode optical signal input to guide 5, for example from the access guide 1, energizes both the fundamental symmetric mode and the asymmetric mode of the first order, in guide 5. Along the two-mode waveguide 5 the effective refractive indices are different from each other for each of the two modes and, for each mode, for each of the two TE and TM polarizations. The two modes interfere along the guide 5 with growing phase differences $\Delta\Phi_{TE}$ and $\Delta\Phi_{TM}$, for TE and TM components respectively, creating a beat in the optical power with a course depending on polarization. At the output of guide 5 the two polarizations therefore can be separated along the two single-mode waveguides 2 and 3 for an appropriate selection of length $L_c$ and of the parameters affecting the effective refractive indices.

For the produced evanescent-wave polarization couplers, the following parameter values have been selected:

C=0 µm
D=14 µm
E=5 mm
θ=0.55°.

For an efficient splitting between TE and TM components emerging from the device, distances A and B must be of at least 30 µm, for polarization couplers having the above stated parameters.

In a device made by the Applicant values A and B for couplers 32, 40 and 37 are 30 µm.

Also the distance between the waveguides 35, 36 and areas 42, 43 at a higher velocity than the acoustic waves must be greater than a minimum distance, dependent on the optical features of the materials and the dimensions of the waveguides. In the case in which both the substrate and optical waveguides are like those of the device made by the Applicant, said distance is at least 35 µm, preferably at least 40 µm, in order to avoid optical losses, resulting from coupling of part of the optical signals to areas 42, 43 which, due to the diffusion of titanium, have an optical refractive index higher than the substrate.

The access waveguides 2 of coupler 32 and 2 of coupler 40 are made with a length greater than the other access waveguides. The radiation from these waveguides propagates through the strip 42 confining the acoustic waveguide, which has a refractive index higher than the substrate, and emerges from the strip 42 by diffusion from the strip surface or due to Fresnel losses at the end of the strip itself.

To improve absorption of the radiation propagating along these access waveguides, optical absorbers 51 may be used which are made for example by depositing a metal layer on the respective waveguide, over a length of 3 or 4 mm. The optical absorbers can be made during the same process steps in which the electroacoustic transducers are made.

Figure 6A:
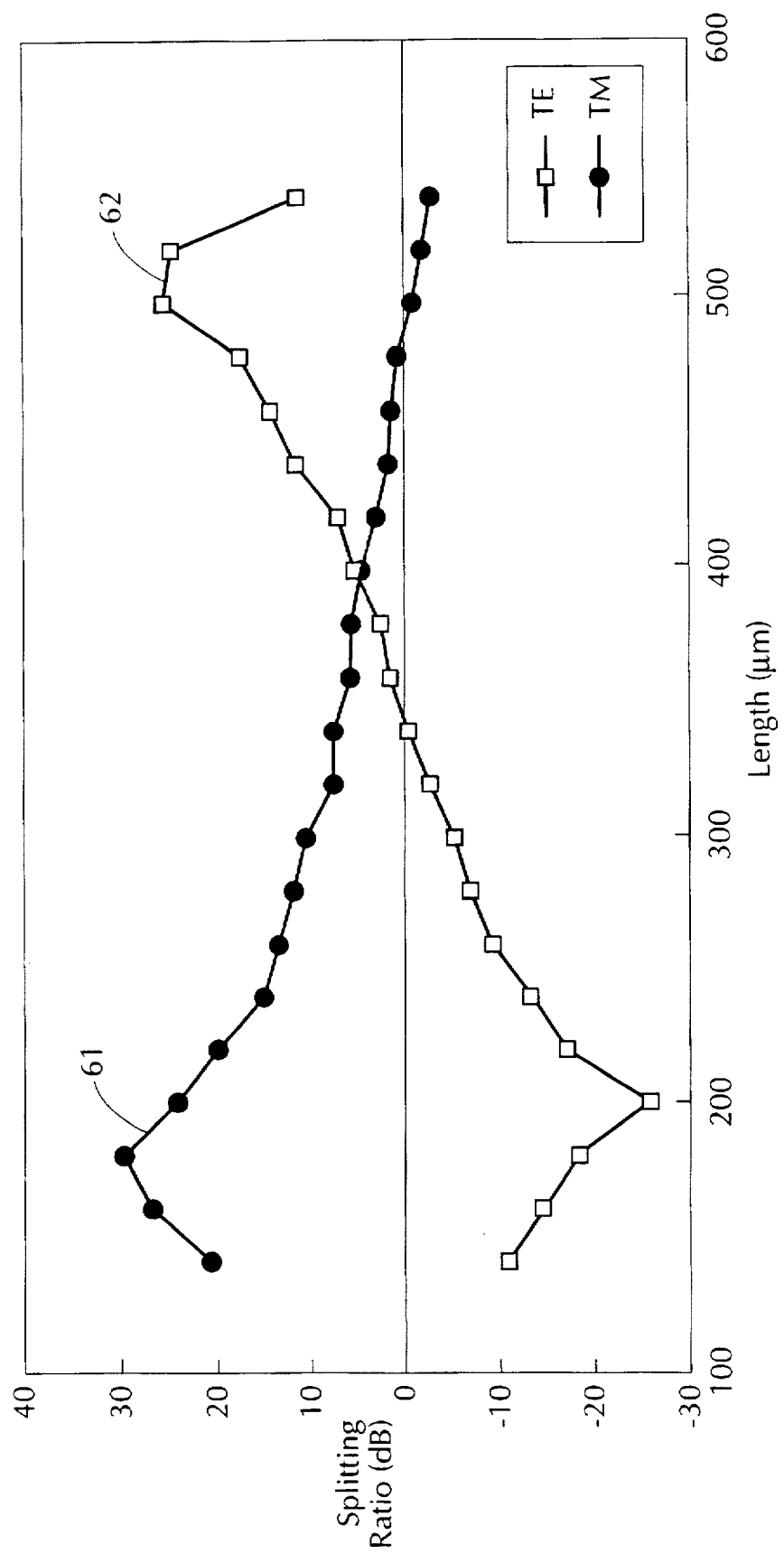
FIGS. 6A, 6B, 6C are graphs showing the splitting ratio of evanescent-wave polarization couplers in the waveguide in relation with: length of the common waveguide section (A); wavelength (B, C)

In order to establish the optimal value of $L_c$ for the evanescent-wave polarization couplers 32, 40 and 37, experimental tests were carried out the results of which are summarized in FIG. 6A.

Several different evanescent-wave couplers were made according to the diagram shown in FIG. 5, said couplers having the stated parameter values and a length $L_c$ comprised between 140 µm and 540 µm.

Reproduced in the graphs of FIG. 6A, depending on length $L_c$ expressed in µm, is the measured splitting ratio $SR_x$ (expressed in dB) of the couplers, defined as:

$$SR_x = \log (P_{x,1}/P_{x,2})$$

wherein $P_{x,1}$ is the output power of x (TE or TM) polarization from one of the output waveguides (the access waveguide 2, for example), whereas $P_{x,2}$ is the output power of x polarization from the other of the output waveguides (the access waveguide 3 in the example shown).

In the graph of FIG. 6A, curve 61 relates to $SR_{TM}$, whereas curve 62 relates to $SR_{TE}$. The two curves show a periodic behavior of $SR_x$ under variation of $L_c$ with different periods for the two polarizations.

A high splitting ratio expressed in absolute value for a given polarization corresponds to an almost complete splitting of the component having such a polarization towards one of the two output ports. A positive value of the splitting ratio corresponds to a bar transmission through the device, that is a transmission in which the signal is almost completely addressed to the output waveguide located on the same side as the input waveguide relative to the center line of waveguide 5 (to the access guide 2, if the signal input takes place from the access guide 1, with reference to FIG. 5). A negative value of the splitting ratio corresponds, instead, to a cross-transmission through the device, that is a transmission in which the signal is almost completely addressed to the output waveguide located on the opposite side from the input waveguide relative to the center line of waveguide 5 (to the access guide 3, if the signal input takes place from the access guide 1, with reference to FIG. 5).

In the case of curve 61 (TM polarization), the reproduced maximum, for values of $L_c$ in the order of 180 µm, corresponds to a bar transmission.

In the case of curve 62 (TE polarization), on the contrary, for values of $L_c$ in the order of 200 µm, the reproduced minimum corresponds to a cross-transmission. The optimal value of $L_c$ is achieved when there is a high splitting ratio, expressed in absolute value, simultaneously for both polarizations, with bar transmission for one polarization and cross-transmission for the other polarization.

Based on the above considerations, a value of $L_c$=180 µm was selected for the evanescent-wave polarization couplers to be employed in the device of the invention, which value ensures a measured splitting ratio of about 25 dB for the TM component and about 25 dB for the TE component, with bar transmission for the TM component and cross-transmission for the TE component.

The corresponding measured attenuations were about 0.4 dB for the TM component and about 0.5 dB for the TE component.

Figure 6B:
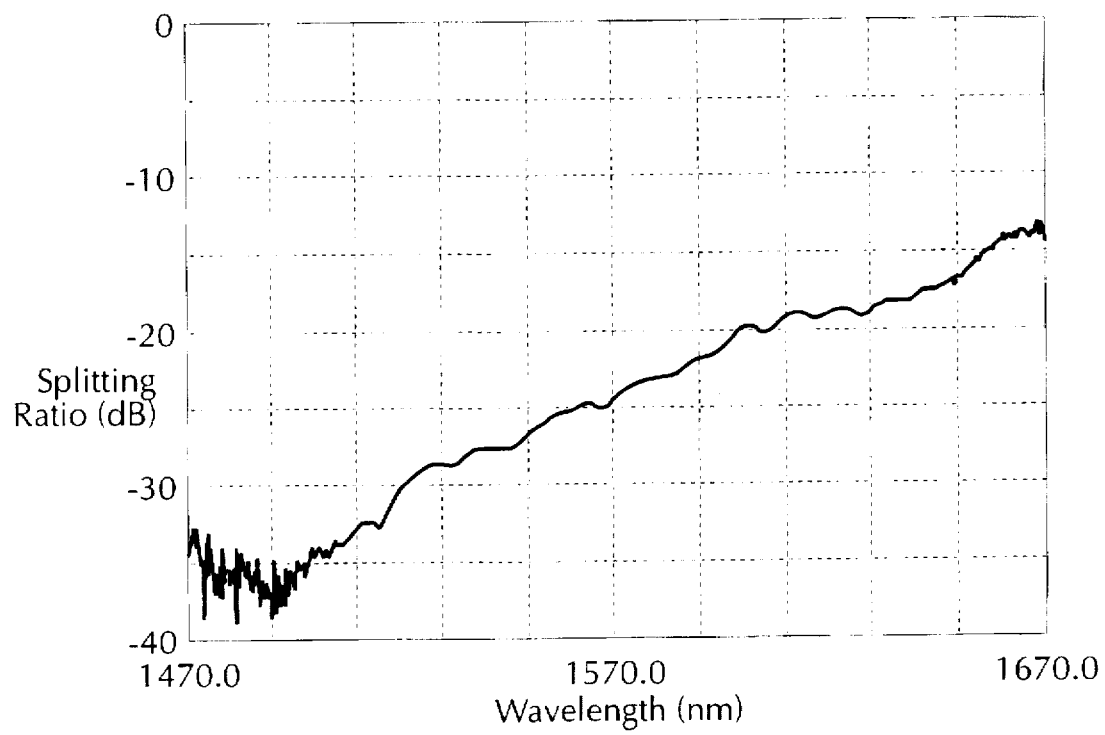
Figure 6C:
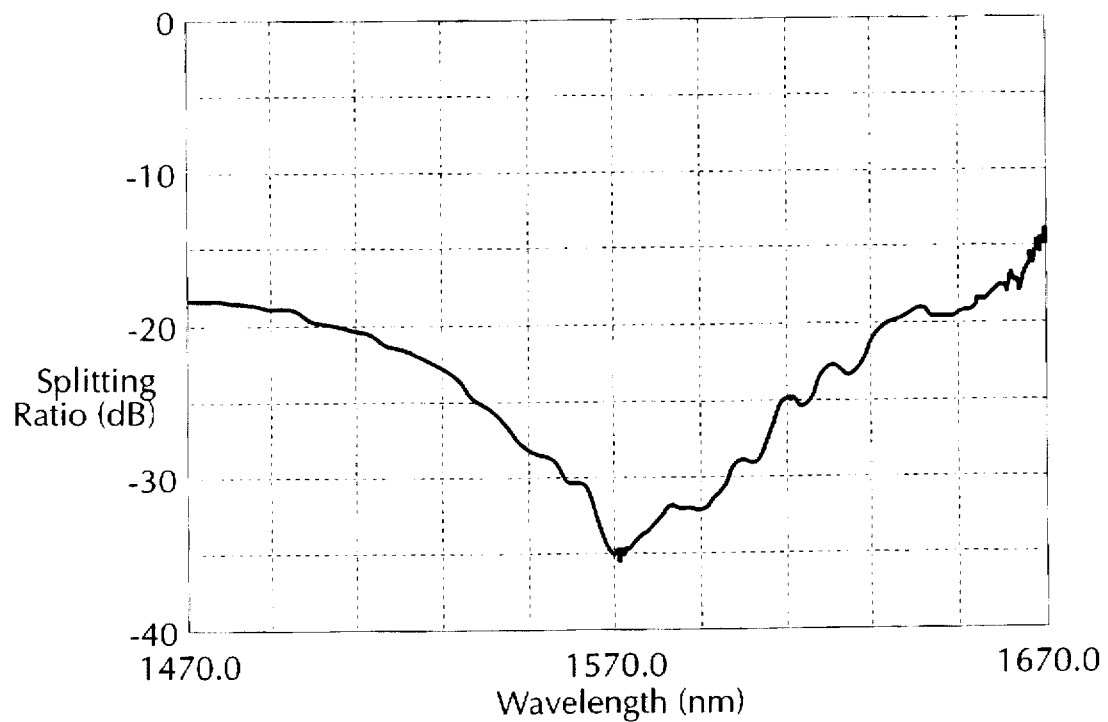

FIGS. 6B and 6C represent the splitting ratio depending on wavelength for evanescent-wave polarization couplers with $L_c$=140 µm for TM polarization (FIG. 6B) and TE polarization (FIG. 6C), respectively.

Figure 4:
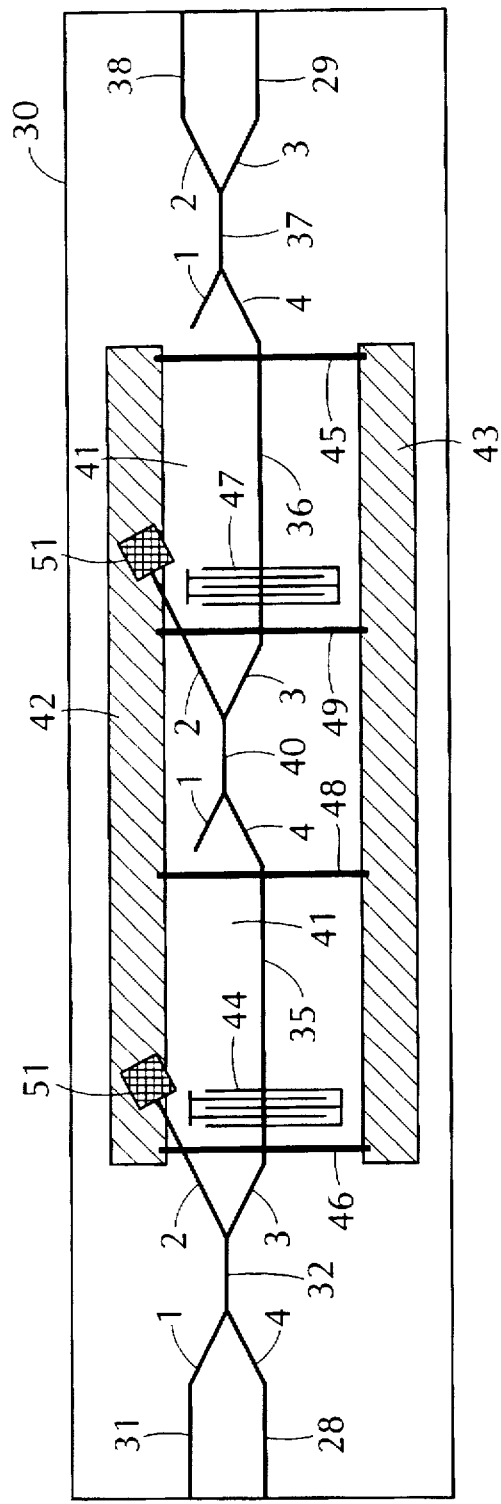
FIG. 4 is a diagram showing an acoustooptical filter according to the invention.

In the acoustooptical device of FIG. 4 couplers 32 and 37 are connected so to exploit cross-transmission, that is they operate as TE pass polarizers. Coupler 40 is connected so to utilize bar transmission, that is it operates as a TM pass polarizer.

The electroacoustic transducer 44 generates, starting from an electric signal of appropriate frequency, an acoustic wave propagating inside the acoustic waveguide 41. In the case of a piezoelectric (such as LiNbO$_3$) substrate, this transducer is advantageously made of interdigitated electrodes deposited on substrate 30. In the case of a substrate made of a non-piezoelectric material, the interdigitated electrodes can be deposited on a piezoelectric-material layer overlying the substrate.

As shown in U.S. Pat. No. 5,002,349 mentioned above, if the substrate is made of LiNbO$_3$, the electroacoustic transducer can be advantageously disposed with an inclination of about 5° to the y axis.

In an acoustooptical device made by the Applicant the electroacoustic transducer is comprised of five pairs of interdigitated electrodes having a periodicity of 21.6 µm, which is the wavelength value in LiNbO$_3$ of a surface acoustic wave having a frequency of about 173.5 MHz, which frequency is necessary for TE⇌TM conversion at an optical wavelength of about 1550 nm. It will be apparent that by modifying the electrode periodicity it is possible to make electroacoustic transducers which are adapted for acoustooptical devices operating in other wavelength bands.

The interdigitated electrodes can be made by depositing a metal (aluminum for example) layer, for example 500 nm thick, upon the substrate. It could be observed that interposition of an intermediate Y$_2$O$_3$ layer helps in decreasing losses in the underlying optical waveguides. In particular, negligible losses could be obtained with an intermediate layer about 100 nm thick. Materials of different types, such as SiO$_2$ or Al$_2$O$_3$, can be employed for the intermediate layer, and thickness must be such selected as to minimize losses in the underlying optical guides without impairing generation of acoustic waves in the is substrate.

The acoustooptical device can be tuned to the wavelengths of 1500 nm or 1600 nm, that is 50 nm moved away from the center wavelength of 1550 nm, thereby supplying the interdigitated electrodes with a power of about 100 mW, as compared to the 50 mW required for operation at the center wavelength.

The process used for making the acoustooptical device according to the invention is greatly simplified as compared with the process for making the device according to the known art. In particular, since the TM pass polarizer consists of a waveguide polarization coupler, it can be inscribed on the substrate during the same process step in which the remaining polarization couplers and optical waveguides are made.

For the acoustooptical device an insertion loss of a value comprised between 2.5 dB and 3.5 dB was determined for signals having a TE polarization (attenuation undergone by the optical signals having a TE polarization and a wavelength corresponding to the center of the passband, on passing through the device).

If also the input and output attenuations are considered which result from coupling between the waveguide and two optical-fibre portions necessary for connection of the acoustooptical device with other components of the optical circuit, the insertion loss for signals of TE polarization is in the value range comprised between 4.0 dB and 5.0 dB.

The half-maximum passband width was determined to be comprised between 1.2 nm and 2.0 nm.

The side lobes of the passband have a reduction of at least 20 dB in relation to the central transmission peak. In the most favorable cases a reduction of 25 dB in the side lobes was determined.

The residual background noise (attenuation of signals having a wavelength outside the passband) is lower than 25 dB.

The described acoustooptical device is adapted for use as a wavelength-controlled filter for signals of defined polarization. In particular it is adapted for use as a wavelength selection filter within a laser cavity, that can be of the active optical fibre type.

A particularly advantageous configuration for the described acoustooptical device is achieved by suitably selecting the lengths of the first and second stages, so that they are in a ratio of about 1:1.6. Thus, the minimums of the spectral response curve relating to the first stage coincide with the maximums of the side lobes in the spectral response curve relative to the second stage, so that the side lobes of the overall spectral response curve in the acoustooptical device are greatly attenuated.

To carry out a complete TE→TM→TE conversion by two stages of different lengths it is necessary that the acoustic power in the first stage should be higher than the acoustic power in the second stage by about 4 dB.

The above can be achieved by attenuating the acoustic power in the second stage by appropriate acoustic absorbers provided along the acoustic waveguide between the first and second stages, by a microlithographic process for example.

Alternatively, the described configuration of the acoustooptical device can be modified by adding acoustic absorption means 46 located along the acoustic waveguide 41 close to the waveguide 35 end connected with coupler 40 and adapted to absorb the residual surface acoustic wave, a second electroacoustic transducer 47 located along the acoustic waveguide 41 close to the waveguide 36 end connected with coupler 40 and adapted to generate a surface acoustic wave within the acoustic waveguide 41 and acoustic absorption means 49 located along the acoustic waveguide 41 close to the waveguide 36 end connected with coupler 40 and adapted to absorb the acoustic wave generated by transducer 47 propagating in a direction opposite to the optical signals.

In this manner the surface acoustic waves propagating in the first and second stages are generated independently of one another. Thus the acoustic powers in the two stages can be different, so as to optimize the spectral features of the acoustooptical device.

It is also possible, through this independent control of the surface acoustic wave in the two stages, to select the centers of the passbands in the two stages slightly separated from each other, so as to obtain a wider passband for the device.

Finally, the independent driving of the two stages allows reduction, to one-half, of the time required for tuning the acoustooptical device. Actually, the time it takes for the acoustic wave to travel over the longer of the two stages in the device is lower than the time necessary to propagate along the whole acoustic waveguide, and is half this value in case of stages having the same length. When the acoustooptical device is used as a filter for multi-channel selection in a wavelength-division multiplexing communication system, a shorter tuning time involves the advantage of a quicker reconfiguration of the system.

An alternative solution to the use of acoustic absorption means 46 (and possibly 49) for absorption of the counter-propagating surface acoustic wave with respect to the optical signals consists in employing unidirectional electroacoustic transducers instead of the electroacoustic transducers 44 (and optionally 47).

Transducers of this type are shown in the article by J. H. Collins et al. entitled "Unidirectional surface wave transducer" published in Proceedings of the IEEE, Proceedings Letters of May 1969, pages 833–835.

Figure 7:
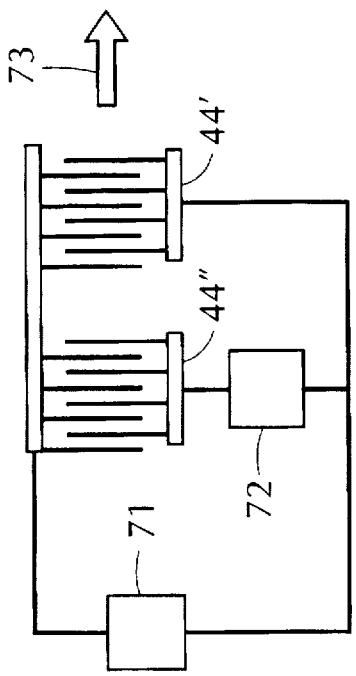
FIG. 7 shows a diagram of a unidirectional electroacoustic transducer.

These transducers can be made, as shown in FIG. 7, by two series of interdigitated electrodes 44' and 44", deposited on a substrate 30, at a distance from each other of (¼+n)·λ$_A$ (wherein λ$_A$ is the acoustic wave length and n is an integer) and driven by electric signals offset through 90°. The electric RF signal produced by generator 71 is input to the series of electrodes 44'. The same signal, after undergoing a 90° phase delay by circuit 72, is input to the electrode series 44".

This configuration produces a destructive interference of the acoustic waves generated on the substrate surface in the direction from the electrode series 44' to the electrode series 44". In the direction from the electrode series 44" to the electrode series 44', on the contrary, there is a constructive interference, with generation of a surface acoustic wave 73 on the substrate surface.

The use of unidirectional electroacoustic transducers enables the acoustic absorption means 46 (and possibly 49) to be omitted and heating of the substrate to be avoided close to said means, which heating is due to dissipation of the acoustic energy therethrough. By doubling the efficiency of the electroacoustic conversion, in addition, a RF source of reduced power can be employed.

Figure 8:
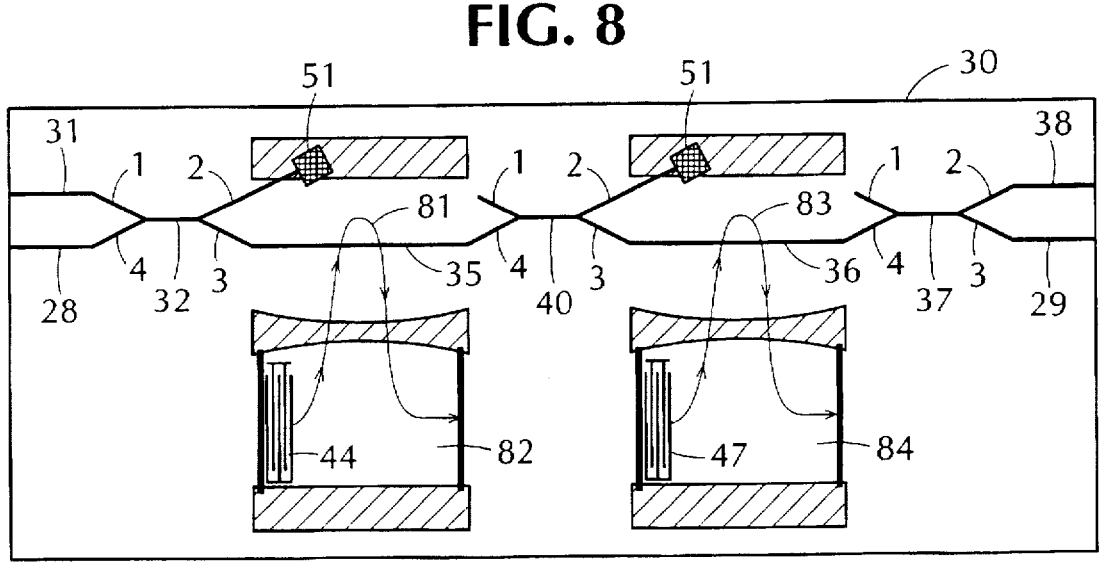
FIG. 8 is a diagram of an acoustooptical filter according to an alternative embodiment of the invention.

An alternative version of the waveguide integrated acoustooptical device will be now described with reference to FIG. 8.

According to this version, optical waveguides and evanescent-wave polarization couplers in the waveguide, of the types described with reference to FIG. 4 and disposed in the same configuration, are provided on a substrate 30.

The optical waveguides 34, 36 rest on substrate portions included within acoustic waveguides 81, 83.

Electroacoustic transducers 44, 47 generate surface acoustic waves propagating through acoustic waveguides 82, 84 disposed respectively side by side with the waveguides 81, 83 so as to form acoustic couplers.

These acoustic waveguide couplers operating in the same manner as optical waveguide couplers, have a central portion in which the acoustic waveguides are close to one another and passage of the surface acoustic waves from one waveguide to the other is possible.

According to the known art, for example, as disclosed in an article by H. Herrmann et al, published in Electronics Letters, Vol. 28. No. 11, 21 May 1992, pages 979–980, these couplers are made in a way that the intensity profile of the surface acoustic wave along the waveguides 81 and 83 has one maximum in the center section of these guides and two minimums at the ends thereof. The optical signals propagating along the optical waveguides 35, 36 interact with an acoustic wave of growing intensity in the first half of the path and decreasing intensity in the second half of the path.

Acoustic absorbers are present at either end of the acoustic waveguides 82, 84 to attenuate the residual surface acoustic waves and the counterpropagating ones with respect to the optical signals. A possible heating of the substrate due to dissipation of the acoustic energy is localized in this device on substrate portions that are not traveled over by optical waveguides and therefore does not represent a problem for operation of the device itself.

The spectral response curve of the acoustooptical device according to the present alternative version has a greater attenuation of the side lobes than the device shown in FIG. 4.

Figure 9:
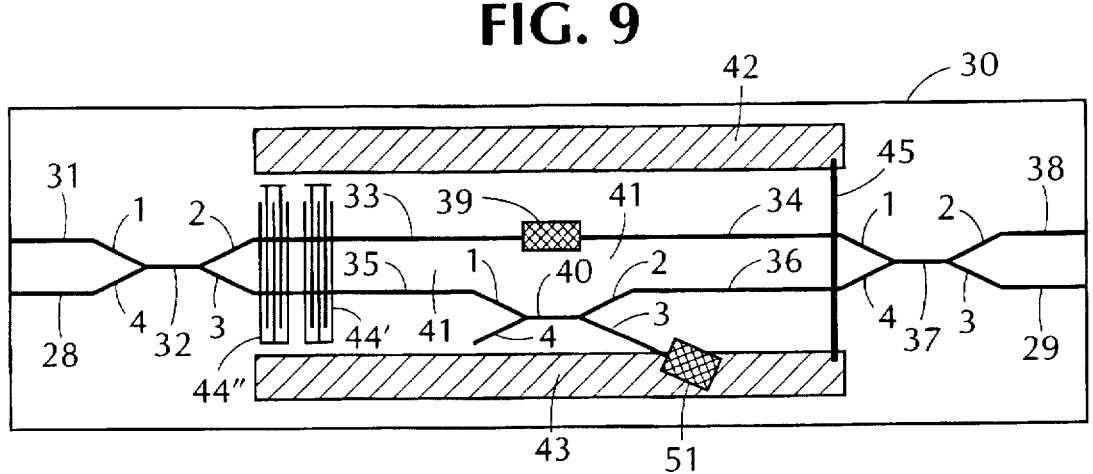
FIG. 9 is a diagram of a polarization independent acoustooptical filter according to the invention.

A two-stage, integrated waveguide, polarization independent acoustooptical device according to the invention will now be described with reference to FIG. 9.

The following components are present on a substrate 30. A channel optical waveguide 31 has one end at the substrate edge and is adapted to receive the optical signals input to the device, through a suitably connected optical fibre, for example. The other end of the waveguide 31 is connected to the access waveguide 1 of a polarization coupler 32. An optical waveguide 28 has one end at the edge of the substrate and the other end connected to the access waveguide 4 of coupler 32. The access guide 2 of coupler 32 is connected to the access 35 guide 1 of a polarization coupler 37, through a waveguide 33, a TE pass polarizer 39 and a waveguide 34. The access guide 3 of coupler 32 is connected to a waveguide 35 connecting up with the access guide 1 of a polarization coupler 40. The access guide 2 of coupler 40 is connected to a waveguide 36 connecting up with the access guide 4 of coupler 37. The access guide 2 of coupler 37 is connected to a waveguide 38 terminating at the substrate edge and enabling the optical signal output, through connection with an optical fibre for example. The access guide 3 of coupler 37, finally, is connected to a waveguide 29 terminating at the substrate edge.

Also formed on the substrate 30 are the following. An acoustic waveguide 41 is extended over a substrate portion comprising the optical waveguides 33, 34, 35, 36 and confined by two strips 42 and 43 in which the acoustic wave velocity is higher than in guide 41. A unidirectional electroacoustic transducer 44', 44" is located along the acoustic waveguide 41, close to the ends of the waveguides 33, 35 connected to coupler 32 and adapted to generate a surface acoustic wave within the acoustic waveguide. Acoustic absorption means 45 is located along the acoustic waveguide 41, close to the ends of the waveguides 34, 36 connected to coupler 37 and adapted to absorb the residual surface acoustic wave.

In a polarization independent acoustooptical device made by the Applicant the same materials were used and the same construction parameter values were selected as those of the acoustooptical device previously described with reference to FIG. 4.

Different materials selected from known birefringent and photoelastic materials and different parameter values can be selected by a person of ordinary skill in the art in order to optimize operation of the device in the different working conditions, in particular as far as the central wavelength of the passband is concerned.

In the device made by the Applicant, the substrate 30 consists of a $LiNbO_3$ crystal cut at right angles to x axis. The waveguides 31, 33, 34, 35, 36, 38 and waveguide 5 sections of the polarization couplers 32, 40, 37 are oriented along the crystal y-axis.

The acoustic waveguides, optical waveguides and polarization couplers are made by deposition and subsequent diffusion of titanium through the substrate. Sizes and manufacture modalities for these components are the same as those stated for the device described with reference to FIG. 4.

In addition, the optical waveguides 33, 35, and 34, 36 respectively must be separated by a minimum distance, in order to avoid superposition of the side tails (evanescent waves) of the signals propagating through the guides themselves and consequent interference couplings of the signals between the guides. This distance is selected by a person skilled in the art depending on the optical features (in particular the refractive indices) of the materials employed and the waveguide sizes. In the case in which the substrate and optical waveguides are like those of the device made by the Applicant, this minimum distance is about 40 μm. Greater values for the distance between the optical waveguides can be selected, in a manner consistent with the requirement of keeping the guides within the area of maximum acoustic intensity, close to the center line of the acoustic waveguide.

Also the distance between the waveguides 33, 34 and the area 42 at greater velocity of the acoustic waves and respectively between the waveguides 35, 36 and the area 43 of greater velocity of the acoustic waves must be higher than a minimum distance dependent on the optical features of the materials and the waveguide sizes. In the case in which the substrate and optical waveguides are the same as in the device made by the Applicant, such a distance is at least 35 µm, preferably at least 40 µm, in order to avoid optical losses resulting from coupling of part of the optical signals to the areas 42, 43 that, due to titanium diffusion, have an optical refractive index higher than that of the substrate.

In a device made by the Applicant, A for coupler 32, A and B for coupler 40 and B for coupler 37 have values of 30 µm. Values of B for coupler 32 and A for coupler 37 are, instead, 30 µm.

Waveguide 3 of coupler 40 is made longer than the other access waveguides. The radiation from this waveguide propagates in the strip 43 confining the acoustic waveguide which has a refractive index higher than the substrate and emerges from strip 43 by diffusion from the strip surface or due to Fresnel losses at the end of the strip itself.

In order to improve absorption of the radiation propagating along this access waveguide, an optical absorber 51 may be employed which is made for example by deposition of à metal layer upon the waveguide, over a length of 3 or 4 mm. The optical absorber can be made during the process steps provided for producing the electroacoustic transducers.

Figure 10:
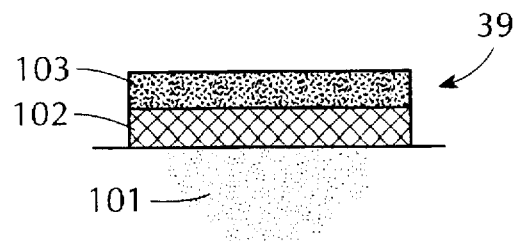
FIG. 10 is a diagram of a waveguide TE pass polarizer used in the device shown in FIG. 9.

The TE pass polarizer 39, made according to a known principle (see the above mentioned article by F. Tian et al. for example) is shown in cross-section in FIG. 10. It consists of a portion about 1.5 mm long of a single-mode optical waveguide 101 of the same type as those already described, made simultaneously with the other waveguides and the polarization couplers, on which a 17 nm thick buffer layer 102 made of $SiO_2$ and a 100 nm thick aluminum layer 103 are deposited over a width of about 30 µm. Polarizer 39 has an extinction ratio greater than 25 dB and supplies the radiation TE component with an attenuation lower than 0.5 dB. The described TE pass polarizer is optimized for operation with a radiation of a wavelength comprised in a band around 1550 nm.

A person skilled in the art will be able to make a TE pass polarizer suitable for different wavelengths by adapting the construction parameters, in particular the thickness or the material of the buffer layer.

In an acoustooptical device made by the Applicant the unidirectional electroacoustic transducer comprises two series 44', 44'', spaced apart about 5 µm from each other, of five pairs of interdigitated electrodes having a periodicity of 21.6 µm, which is the wavelength value in $LiNbO_3$ of a surface acoustic wave having a frequency of about 173.5 MHz, which frequency is necessary for TE⇌TM conversion at an optical wavelength of about 1550 nm. It is apparent that by modifying the electrode periodicity it is possible to make electroacoustic transducers suitable for optical filters operating in other wavelength bands. The interdigitated electrodes are made following the modalities already described with reference to the device of FIG. 4.

For the described acoustooptical device an insertion loss (attenuation undergone by the optical signals of a wavelength corresponding to the passband center, on passing through the device) of a value comprised between 2.5 dB and 3.5 dB was determined.

If also the input and output attenuations are considered which result from a coupling between the waveguide and two optical fibre portions necessary for connection of the device with other components of the optical circuit, the insertion loss reaches values of 4.0 dB to 5.0 dB. The half-maximum width of the passband was determined to be comprised between 1.2 nm and 2.0 nm.

The side lobes of the passband have a reduction of at least 20 dB with respect to the center transmission peak. In the most favorable cases a reduction of 25 dB in the side lobes was determined.

The polarization dependent loss (difference in attenuation between the two components of the optical signals with a perpendicular polarization) is limited to a value comprised between 0.5 dB and 1.0 dB.

The residual background noise (attenuation of signals having a wavelength outside the passband) is lower than −25 dB.

The described polarization independent acoustooptical device is adapted for use as a wavelength-controlled filter. In particular it is adapted for use as a filter for channel selection in a WDM optical communication system. By driving the electroacoustic transducer with an electric signal which is the superposition of several electric signals of different frequencies, one gets a passband for the filter consisting of the sum of several different wavelength intervals, as many as the different frequency components of the electric driving signal, wherein the wavelengths corresponding to the center of each of said intervals depend on the frequencies of said components of the electric driving signal. In this manner, the acoustooptical filter can be utilized for the simultaneous selection of several channels of different wavelengths, to be controlled by the electric driving signal.

The described polarization independent acoustooptical device may be also used for regenerating the shape of the pulses in a pulse optical communication system.

Also in the case of the described polarization independent acoustooptical device it is possible to introduce the alternative version of an independent generation of the surface acoustic waves in the two stages of the device, for example by a second unidirectional electroacoustic transducer, not shown in FIG. 9, consisting of two series of interdigitated electrodes, made in the same manner as the transducer described with reference to FIG. 7, located along the acoustic waveguide 41 close to the ends of waveguides 34, 36 which are connected to polarizer 39 and coupler 40 and adapted to generate a surface acoustic wave within the acoustic waveguide 41, and acoustic absorption means 46 (not shown in FIG. 9) located along the acoustic waveguide 41 close to the ends of waveguides 33, 35 which are connected to polarizer 39 and coupler 40 and adapted to absorb the residual surface acoustic wave in the first stage of the device.

A two-stage waveguide integrated acoustooptical device according to the invention can be also made using TE pass and TM pass polarizers between the first and second stages, both consisting of evanescent-wave polarization couplers in the waveguide.

Figure 11:
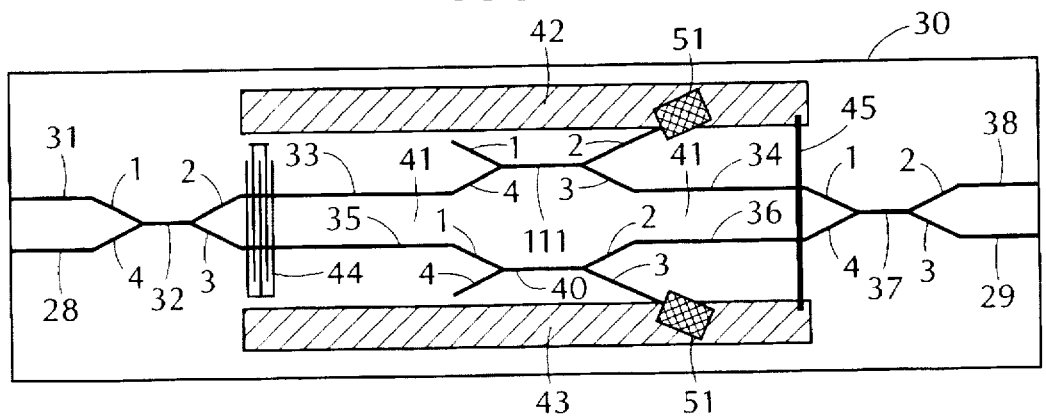
FIG. 11 is a diagram of a polarization independent acoustooptical filter according to the invention.

A first embodiment of this configuration, shown in FIG. 11, comprises the following components, on a substrate 30 of birefringent and photoelastic material. Three evanescent-wave polarization couplers 32, 40, 37 are in the waveguide and of the same type as the one described with reference to FIG. 5, whose length $L_c$ is selected in a way to enable bar-transmission for the TM component and cross-transmission for the TE component. An evanescent-wave polarization coupler 111 of the type described with reference to FIG. 5 is included, whose length $L_c$ is selected in a way to enable bar-transmission for the TE component and cross-transmission for the TM component. A channel optical waveguide 31 starting at the end of the substrate is connected to the access waveguide 1 of coupler 32. An optical waveguide 28 starting at the substrate edge is connected to the access waveguide 4 of coupler 32. A waveguide 33 is connected between the access guide 2 of coupler 32 and the access guide 4 of coupler 111. A waveguide 34 is connected between the access guide 3 of coupler 111 and the access guide 1 of coupler 37. A waveguide 35 is connected between the access guide 3 of coupler 32 and the access guide 1 of coupler 40. A waveguide 36 is connected between the access guide 2 of coupler 40 and the access guide 4 of coupler 37. A waveguide 38 is connected to the access guide 2 of coupler 37 and terminates at the substrate edge. A waveguide 29 is connected to the access guide 3 of coupler 37 and terminates at the substrate edge. An acoustic waveguide 41 is extended over a substrate portion comprising the optical waveguides 33, 34, 35, 36, confined by two strips 42, 43 in which the acoustic wave velocity is higher than in the waveguide 41. An electroacoustic transducer 44 is located along the acoustic waveguide 41 close to the ends of waveguides 33 and 35 connected to coupler 32 and adapted to generate a surface acoustic wave within the acoustic waveguide. Acoustic absorption means 45 is located along the acoustic waveguide 41 close to the ends of waveguides 34, 36 connected to coupler 37 and adapted to absorb the residual surface acoustic wave.

The waveguides 31, 33, 34, 35, 36, 38 and waveguide 5 sections of the polarization couplers 32, 111, 40, 37 are parallel to one another.

The access waveguides 2 of coupler 111 and 3 of coupler 40 are made of a greater length than the other access waveguides. Radiation from these waveguides propagates in the strips 42 and 43 confining the acoustic waveguide, which has a higher refractive index than the substrate, and emerges from strips 42 and 43 by scattering from the strip surface or due to Fresnel losses at the end of the strips themselves.

To improve absorption of the radiation propagating along these access waveguides optical, absorbers 51 may be used, made for example by deposition of a metal layer on the respective waveguide, over a length of 3 or 4 mm. The optical absorbers can be made during the same process steps provided for making the electroacoustic transducers.

The length $L_c$ of waveguides 5 of the polarization coupler 111, for enabling bar-transmission of the TM component and cross-transmission of the TE component at wavelengths of about 1550 nm, is comprised between 500 µm and 1000 µm for a bifurcation angle between the access waveguides $\theta = 0.55°$. By increasing this angle it is possible, according to calculations made by the Applicant, to reduce the length $L_c$ with respect to the stated values.

Selection of the substrate material and orientation thereof, sizes and manufacture techniques for optical and acoustic waveguides, polarization couplers and electroacoustic transducers can follow the same criteria as those stated for similar components used in the device described with reference to FIG. 9.

This embodiment has the advantage that it can be manufactured in a very simple manner. The optical waveguides and polarization couplers in particular can be simultaneously inscribed in the substrate, thereby eliminating the step of making the TE pass polarizer and consequently reducing the number of the process steps necessary for the device production.

Figure 12:
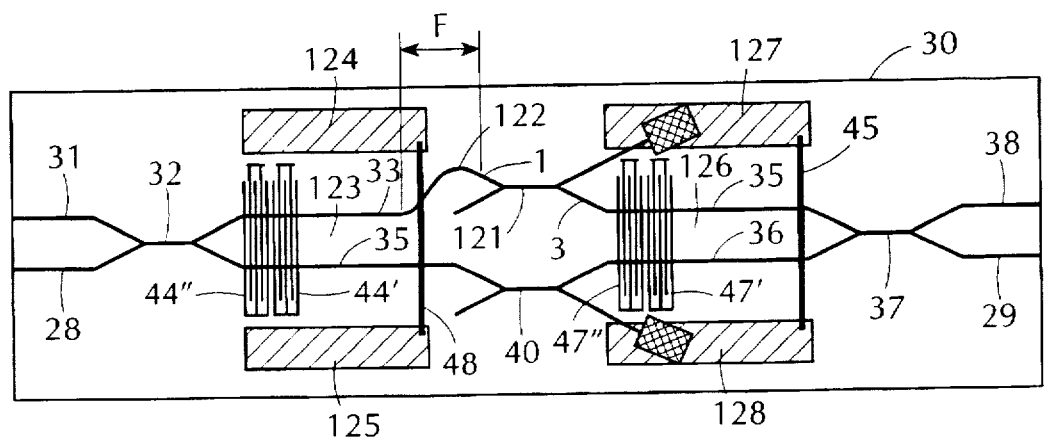
FIG. 12 is a diagram of a polarization independent acoustooptical filter according to another alternative embodiment of the invention.

In a second alternative embodiment, schematically shown in FIG. 12, it is foreseen the use of an evanescent-wave polarization coupler 121, identical with polarization couplers 32, 37, 40, acting as a TM pass polarizer between the first and second stages. Coupler 121 is connected to the rest of the optical circuit on the substrate by access waveguides 1, 3 located on opposite sides from the center line of waveguide 5, in a way to exploit the cross-transmission mode.

Connection of waveguide 33 with the access waveguide 1 of coupler 121 takes place by a curved section 122 of a channel optical waveguide of length F. To avoid superpositions between the curved section 122 and the strips confining the acoustic waveguide that could involve losses for the optical signals propagating in the curved section 122 towards the strips themselves, the acoustic waveguide and related confining strips should be interrupted in the center portion. In this manner, two acoustic waveguides 123 and 126 are formed, one for each stage of the device, respectively defined by strips 124, 125 and 127, 128, with greater velocity for the surface acoustic waves.

The optical waveguides 33, 35 and 34, 36 are included respectively in the substrate portion on which the acoustic waveguides 123 and 126 extend.

In addition, corresponding to the acoustic waveguides 123, 126 are unidirectional electroacoustic transducers 44', 44" and 47', 47" located along the waveguides at the ends connected to coupler 32 and couplers 121, 40 respectively, and adapted to generate surface acoustic waves in the respective acoustic waveguides, and acoustic absorption means 48, 45, located along the waveguides at the ends connected to couplers 121, 40 and coupler 37, respectively.

The device in this second alternative embodiment is completed with components similar to those employed in the previous solutions, to the description of which one may refer, disposed in an identical configuration.

In one example, the length F of the curved section 122 was about 4 mm and the corresponding bending radius of the optical waveguide was not less than 100 mm, in order to reduce possible losses due to bending of the optical waveguide.

The manufacturing process of the device according to this second alternative embodiment has the same advantages as for the first embodiment, in terms of reduction in the number of required steps. In addition, in the second embodiment all polarization couplers are identical with each other, which makes the device more insensitive to process changes and simplifies the design step, since there is no need to optimize the size of one polarization coupler to enable therein, unlike in the other couplers, bar-transmission of the TE component and simultaneous cross-transmission of the TM component.

Figure 13:
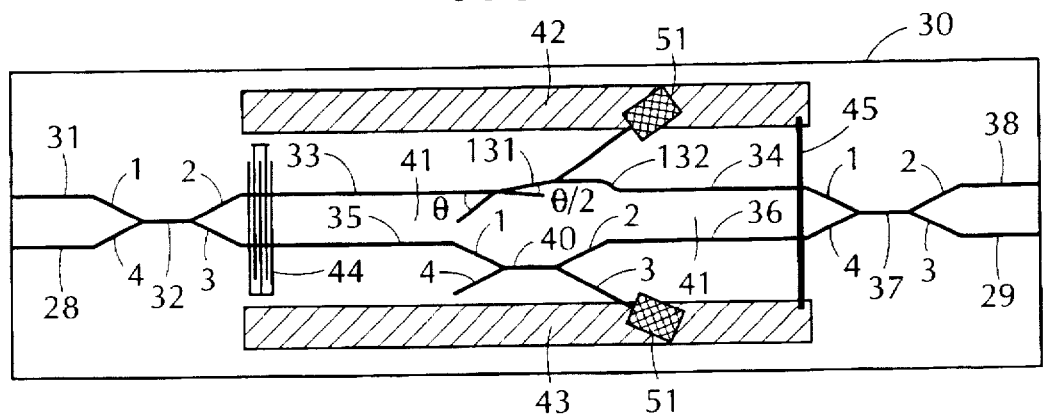
FIG. 13 is a diagram of a polarization independent acoustooptical filter according to a still further alternative embodiment of the invention.

A third alternative embodiment, schematically shown in FIG. 13 differs from the second embodiment because one evanescent-wave polarization coupler 131 is arranged in a rotated position with respect to the direction of waveguides 31, 33, 34, 35, 36, 38.

Rotation, through an angle corresponding to half the bifurcation angle $\theta$ between the access waveguides of the coupler itself, allows to reduce the length of the curved connection section 132 between the access waveguides of the coupler and the optical waveguides of the device. In particular, the length of the curved connection section 132 can be lower than 0.5 mm.

In the case in which the substrate is formed of a LiNbO₃ material, with propagation of the radiation along the crystal y-axis, the rotated coupler operates substantially in the same way as the other couplers if the rotation angle $\theta/2$ is smaller than the accuracy by which it is possible to fix the orientation of the crystal y-axis relative to the substrate, which accuracy is about 0.3°.

Otherwise, to compensate for possible small differences, the whole filter structure can be rotated through about $\theta/4$ in the opposite direction, and the advantages relating to the third embodiment of the device are maintained.

On describing the devices according to the invention reference has been hitherto made to surface acoustic waves and optical signals propagating in the same direction along the respective parallel waveguides. It is also possible to provide an embodiment in which surface acoustic waves propagate in a direction opposite to the optical signals.

In order to improve the directional quality of the acoustic waves and have areas of maximum acoustic intensity close to the optical waveguides, the use of acoustic waveguides has been described. However, in accordance with the present invention it is also possible to provide the use of directional transducers generating surface acoustic waves propagating in the direction of the optical waveguides, in the absence of acoustic waveguides.

Likewise, the alternative versions given in connection with some of the described devices can be also applied to the other described devices, after carrying out the appropriate adaptations obvious to a person of ordinary skill in the art.

Even if so far the invention has been described with reference to the case in which a polarizer, connecting the two acoustic-wave interaction stages of the device, consists of a single evanescent-wave polarization coupler, it will be apparent to the person skilled in the art that, when slight increases in the overall length and in the attenuation of the device are acceptable, one or each of the polarizers connecting the two stages may consist of two (or, possibly, more) serially connected evanescent-wave polarization couplers, whereby a lower extinction ratio, for each such polarizer, and a lower background noise, for the device as a whole, can be obtained.

We claim:

1. An acoustooptical waveguide device for wavelength selection, comprising one substrate of a birefringent and photoelastic material on which are formed:

a first acoustooptical rotation stage means for converting the polarization plane of an optical signal in a first wavelength interval and including at least one optical waveguide traveled over by said signal;

a second acoustooptical rotation stage means for converting the polarization plane of an optical signal in a second wavelength interval and including at least one optical waveguide traveled over by said signal;

at least one optical waveguide, connecting said first and second acoustoopical stage means and including a polarizer, wherein said polarizer comprises an evanescent-wave polarization coupler; and at least one optical waveguide, downstream of said second acoustoopical stage means and including a polarization-selective element.

2. An acoustooptical device according to claim 1, wherein at least one of said first and second acoustooptical stage means comprises means for generating a surface acoustic wave.

3. An acoustooptical device according to claim 2, wherein said substrate comprises an acoustic waveguide including at least one section of one of said optical waveguides of said first and second acoustooptical stage means.

4. An acoustooptical device according to claim 3, comprising a first acoustic waveguide extended over a substrate portion including said optical waveguide of said first acoustooptical stage means, and a second acoustic waveguide extended over a substrate portion including said optical waveguide of said second acoustooptical stage means.

5. An acoustooptical device according to claim 3, wherein said means for generating a surface acoustic wave is located within at least one of said acoustic waveguides, close to one end of the latter, for unidirectional propagation of said acoustic wave in said acoustic waveguide.

6. An acoustooptical device according to claim 5, wherein said means for generating a surface acoustic wave comprises a series of interdigitated electrodes disposed transversally of said acoustic waveguide.

7. An acoustooptical device according to claim 6, comprising an acoustic absorber disposed at said end of said acoustic waveguide.

8. An acoustooptical device according to claim 5, comprising an acoustic absorber located at the end of said acoustic waveguide opposite to the end where said means for generating a surface acoustic wave is located.

9. An acoustooptical device according to claim 5, wherein said means for generating surface acoustic waves consists of two series of interdigitated electrodes, disposed at a predetermined distance from each other, respectively supplied with a first alternating-voltage electric signal and a second electric signal obtained by offsetting said first electric signal through 90°, for generating a unidirectional acoustic wave.

10. An acoustooptical device according to claim 1, comprising two optical parallel waveguides in each of said first and second acoustooptical stage means and two optical connection waveguides between said first and second acoustooptical stage means, wherein each optical connection waveguide carries one polarizer adapted to transmit one of two mutually-perpendicular polarization components and wherein at least one of said polarizers consists of an evenescent-wave polarization coupler.

11. An acoustooptical device according to claim 10, wherein one of said polarizers is a TE pass polarizer and comprises a metal layer overlying the corresponding optical connection waveguide between the first and second acoustooptical stage means, with a buffer layer interposed therebetween.

12. An acoustooptical device according to claim 10, wherein each of said polarizers comprises an evanescent-wave polarization coupler.

13. An acoustooptical device according to claim 12, wherein both said evanescent-wave polarization couplers are bar-transmission couplers for the respective passing polarization.

14. An acoustooptical device according to claim 12, wherein one of said evanescent-wave polarization coupler is a bar-transmission coupler for the respective passing polarization and the second of said evanescent-wave polarization couplers is a cross-transmission coupler for the respective passing polarization.

15. An acoustooptical device according to claim 14, wherein said second evanescent-wave polarization coupler is connected to the respective optical connection waveguide by a curved waveguide section.

16. An acoustooptical device according to claim 14, wherein said second evanescent-wave polarization coupler comprises a straight central section forming a non-zero angle with the respective connection waveguide.

17. An acoustooptical device according to claim 12, wherein at least one of said polarizers comprises two evanescent-wave polarization couplers.

18. An acoustooptical device according to claim 17, wherein each of said polarizers comprises two evanescent-wave polarization couplers.

19. An acoustooptical device according to claim 1, wherein said birefringent and photoelastic material is $LiNbO_3$.

20. An acoustooptical device according to claim 19, wherein said optical waveguides and evanescent-wave polarization couplers are made by photolithographic masking, deposition of a metal layer and subsequent diffusion of the metal within the substrate.

21. An acoustooptical device according to claim 20, wherein said metal is titanium.

22. A process for making an acoustooptical waveguide device for wavelength selection, comprising the following steps:

forming at least one acoustic waveguide on a substrate made of a birefringent and photoelastic material, by diffusion of a first metal within said substrate;

forming first and a second evanescent-wave polarization couplers on said substrate, by photolithographic deposition and subsequent diffusion of a second metal within the substrate itself, as well as at least one optical waveguide for connection between said polarization couplers, which optical waveguide is at least partly included in said acoustic waveguide;

forming a polarizer along said optical connection waveguide;

forming an electroacoustic transducer comprising interdigitated electrodes, within at least one of said acoustic waveguides, by photolithographic deposition of a third metal onto said substrate;

characterized in that said step of forming a polarizer is included in said step of forming said first and second polarization couplers and said optical connection waveguide, and includes forming a third evanescent-wave polarization coupler.

23. A process for making an acoustooptical device according to claim 22, wherein said first, second and third evanescent-wave polarization couplers are identical with each other.

24. A process for making an acoustooptical device according to claim 22, comprising the formation on said substrate, by photolithographic deposition and subsequent diffusion of said second metal within the substrate itself, of a first and a second optical connection waveguides between said first and second polarization couplers, which optical waveguides are at least partly included in said acoustic waveguide, and the formation of a polarizer along each of said optical connection waveguides.

25. A process for making an acoustooptical device according to claim 24, wherein said step of forming said polarizers is included in said step of forming said first and second polarization couplers and said optical connection waveguides, and includes forming third and fourth evanescent-wave polarization couplers along said first and second optical connection waveguides, respectively.

26. A process for making an acoustooptical device according to claim 25, wherein said first, second, third and fourth evanescent-wave polarization couplers are identical with each other.

* * * * *